United States Patent
Kim et al.

(10) Patent No.: US 8,938,131 B1
(45) Date of Patent: Jan. 20, 2015

(54) APPARATUS AND METHOD FOR REGISTRATION OF FLAT PANEL DISPLAY DEVICE AND IMAGING SENSOR, AND ELECTRONIC DEVICE HAVING FLAT PANEL DISPLAY DEVICE AND IMAGING SENSOR WHICH ARE REGISTERED USING THE METHOD

(71) Applicant: Center of Human-Centered Interaction for Coexistence, Seoul (KR)

(72) Inventors: Jun Sik Kim, Seoul (KR); Jung Min Park, Seoul (KR)

(73) Assignee: Center of Human-Centered Interaction for Coexistence, Seoul (KR)

( * ) Notice: Subject to any disclaimer, the term of this patent is extended or adjusted under 35 U.S.C. 154(b) by 0 days.

(21) Appl. No.: 14/293,189

(22) Filed: Jun. 2, 2014

(30) Foreign Application Priority Data

Nov. 1, 2013 (KR) .......................... 10-2013-0132079

(51) Int. Cl.
*G06K 9/32* (2006.01)
*G06F 3/0346* (2013.01)
(52) U.S. Cl.
CPC .................................... *G06F 3/0346* (2013.01)
USPC ......................................... 382/293; 382/294

(58) Field of Classification Search
USPC .................................. 382/154, 291, 293, 294
See application file for complete search history.

(56) References Cited

U.S. PATENT DOCUMENTS

| | | | |
|---|---|---|---|
| 6,527,395 B1 | 3/2003 | Raskar | |
| 8,267,761 B2 * | 9/2012 | Hagiwara | 463/9 |
| 8,295,588 B2 * | 10/2012 | Fujieda et al. | 382/154 |
| 8,384,770 B2 * | 2/2013 | Konno et al. | 348/51 |
| 2011/0305368 A1 * | 12/2011 | Osako | 382/103 |
| 2012/0075343 A1 * | 3/2012 | Chen et al. | 345/633 |
| 2013/0120224 A1 * | 5/2013 | Cajigas et al. | 345/8 |
| 2014/0193037 A1 * | 7/2014 | Stitzinger et al. | 382/103 |

\* cited by examiner

*Primary Examiner* — Phuoc Tran
(74) *Attorney, Agent, or Firm* — Husch Blackwell LLP

(57) ABSTRACT

The present invention relates to an auxiliary registration apparatus for registering a display device and an image sensor. The apparatus includes a camera; a panel interoperated with the camera and on which a first pattern is displayed; and a control part which allows the first pattern to be shot with the image sensor and a second pattern displayed on a screen of the display device to be shot with the camera; wherein the control part allows information on a transformation relationship between a coordinate system of the display device and that of the image sensor to be acquired by referring to information on a transformation relationship between a coordinate system of the panel and that of the image sensor and information on a transformation relationship between a coordinate system of the camera and that of the display device.

13 Claims, 2 Drawing Sheets

APPARATUS AND METHOD FOR REGISTRATION OF FLAT PANEL DISPLAY DEVICE AND IMAGING SENSOR, AND ELECTRONIC DEVICE HAVING FLAT PANEL DISPLAY DEVICE AND IMAGING SENSOR WHICH ARE REGISTERED USING THE METHOD

CROSS REFERENCE TO RELATED APPLICATION

This application claims priority to and incorporates herein by reference all disclosure in Korean Patent Application No. 10-2013-0132079 filed Nov. 1, 2013.

FIELD OF THE INVENTION

The present invention relates to an apparatus and a method for registering a display device and an image sensor; and more particularly, to the apparatus, and the method for registering a flat panel display device that provides 3D images for a user and the image sensor that acquires user information.

BACKGROUND OF THE INVENTION

Supply of smart devices such as smart phones and smart TVs have been making it active to study (or investigate) about user interface based on human gestures.

Currently, user interface methods based on user gestures include a contact sensing method which requires a user to directly touch a finger, etc. on a screen, and a non-contact sensing method which uses information acquired by using an imaging sensor, e.g., a camera sensor, without requiring the user to touch on the screen.

However, it is common that the existing user interface method using non-contact sensing methods simply develop a graphical user interface (GUI) that moves a medium like a mouse pointer on the screen and selects an icon by analyzing the user's motion.

Recently, three-dimensional (3D) display devices that provide 3D information for users such as 3D TVs are supplied.

To provide a more realistic interface environment for users by using the 3D display devices, it is necessary to provide a correct visual perception and reaction of virtual objects that makes a user feel as if he or she directly touch his or her hands on the perceived virtual objects, not by controlling a medium such as a pointer or an avatar. According to the conventional technology, a method for generating images for a user's correct visual perception by using an image sensor observing both the user and the images on the display simultaneously, is provided.

But it is usual to place the image sensor which is built in a smart phone, a smart TV, etc. in a same direction with a screen of such display device to observe a user or an object facing the screen so that the image sensor cannot observe the image displayed on the screen.

As such, under the conventional technology in the device environment where the image outputted through the screen cannot be directly observed by the image sensor, the conventional method is difficult to be applied and it is essential to set a location relationship between the display device and the image sensor that observes the user or the object.

SUMMARY OF THE INVENTION

It is an object of the present invention to solve all the problems mentioned above.

It is another object of the present invention to provide an apparatus and a method for registering a display device and an image sensor which are included in an electronic device by obtaining a transformation relationship between a unique coordinate system of the image sensor, i.e., a sensor coordinate system, and a unique coordinate system of the display device, i.e., a display coordinate system, wherein the sensor coordinate system functions as a reference for processing data and the display coordinate system functions as a reference for outputting an image through a screen of the display device.

In accordance with one aspect of the present invention, there is provided an auxiliary registration apparatus for registering a display device and an image sensor, including: a camera; a panel which is interoperated with the camera and on which a first pattern is displayed; and a control part which allows the first pattern displayed on the panel to be shot with the image sensor and a second pattern which is a pattern displayed on a screen of the display device to be shot with the camera, by allowing locations or angles of the camera and the panel to be adjusted; wherein the control part allows information on a transformation relationship between a coordinate system of the display device and that of the image sensor to be acquired by referring to information on a transformation relationship between a coordinate system of the panel and that of the image sensor obtained by using information on the first pattern shot with the image sensor and information on a transformation relationship between a coordinate system of the camera and that of the display device obtained by using information on the second pattern shot with the camera, to thereby allow the information on the transformation relationship between the coordinate system of the display device and that of the image sensor to be used to register the display device and the image sensor.

In accordance with another aspect of the present invention, there is provided a method for registering a display device and an image sensor by using an auxiliary registration apparatus including a camera and a panel interoperated with the camera, including steps of: (a) allowing a first pattern as a pattern displayed on the panel of the auxiliary registration apparatus to be shot with the image sensor and a second pattern as a pattern displayed on a screen of the display device to be shot with the camera of the auxiliary registration apparatus; and (b) allowing information on a transformation relationship between a coordinate system of the display device and that of the image sensor to be acquired by referring to information on a transformation relationship between a coordinate system of the panel and that of the image sensor obtained by using information on the first pattern shot with the image sensor and information on a transformation relationship between a coordinate system of the camera and that of the display device obtained by using information on the second pattern shot with the camera, to thereby allow the information on the transformation relationship between the coordinate system of the display device and that of the image sensor to be used to register the display device and the image sensor.

In accordance with still another aspect of the present invention, there is provided an electronic device which is registered by using an auxiliary registration apparatus including a camera and a panel, interoperated with the camera, on which a first pattern is displayed, including: a display device with a screen which displays a second pattern; and an image sensor interoperated with the display device; wherein information on a transformation relationship between a coordinate system of the display device and that of the image sensor, which is acquired by referring to information on a transformation relationship between a coordinate system of the panel and that of the image sensor obtained by using information on the first pattern shot with the image sensor and information on a transformation relationship between a coordinate system of the camera and that of the display device obtained by using information on a second pattern shot with the camera, is used to provide the display device and the image sensor in a registered state.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

The desirable embodiments in which the present invention can be performed will be explained with reference to the attached drawings. In the following detailed description, reference is made to the accompanying drawings that show, by way of illustration, specific embodiments in which the invention may be practiced. The present invention was explained by referring to example embodiments illustrated in drawings but this is explained as one example embodiment and this does not limit the spirit, core components and operation of the present invention.

Figure 1:
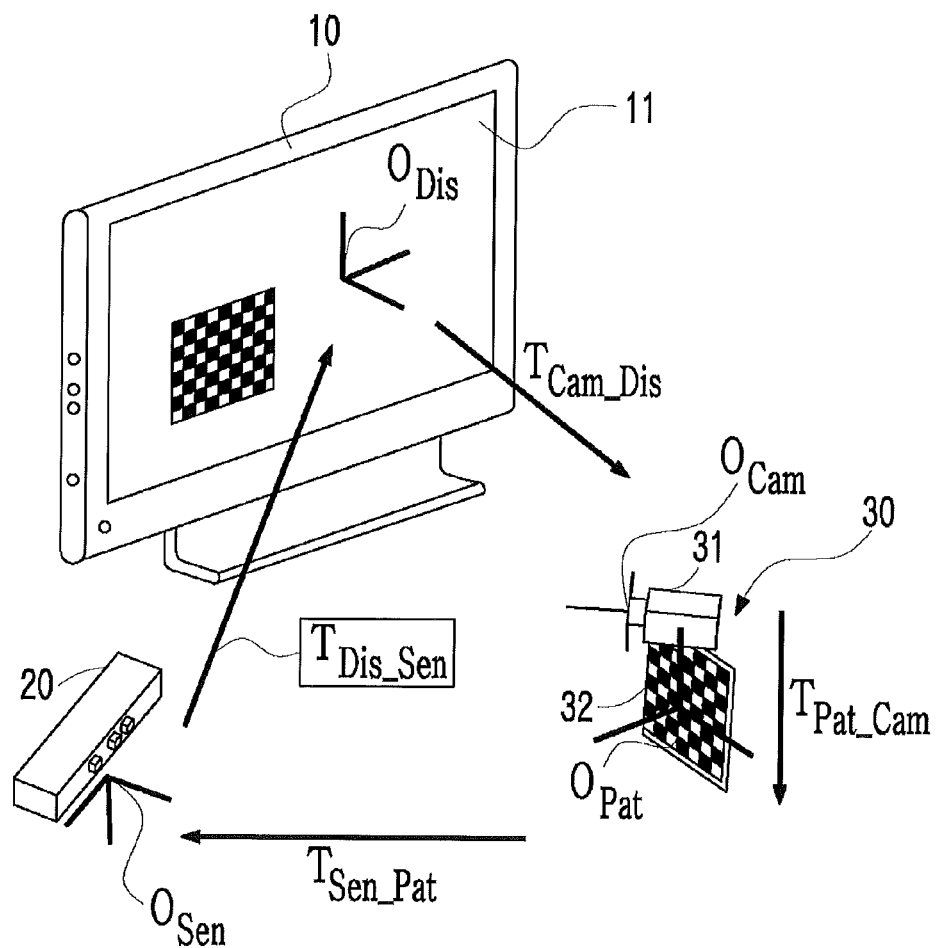
FIG. 1 is a schematic diagram for explaining a system to register a display device and an image sensor in accordance with the present invention.
Figure 2:
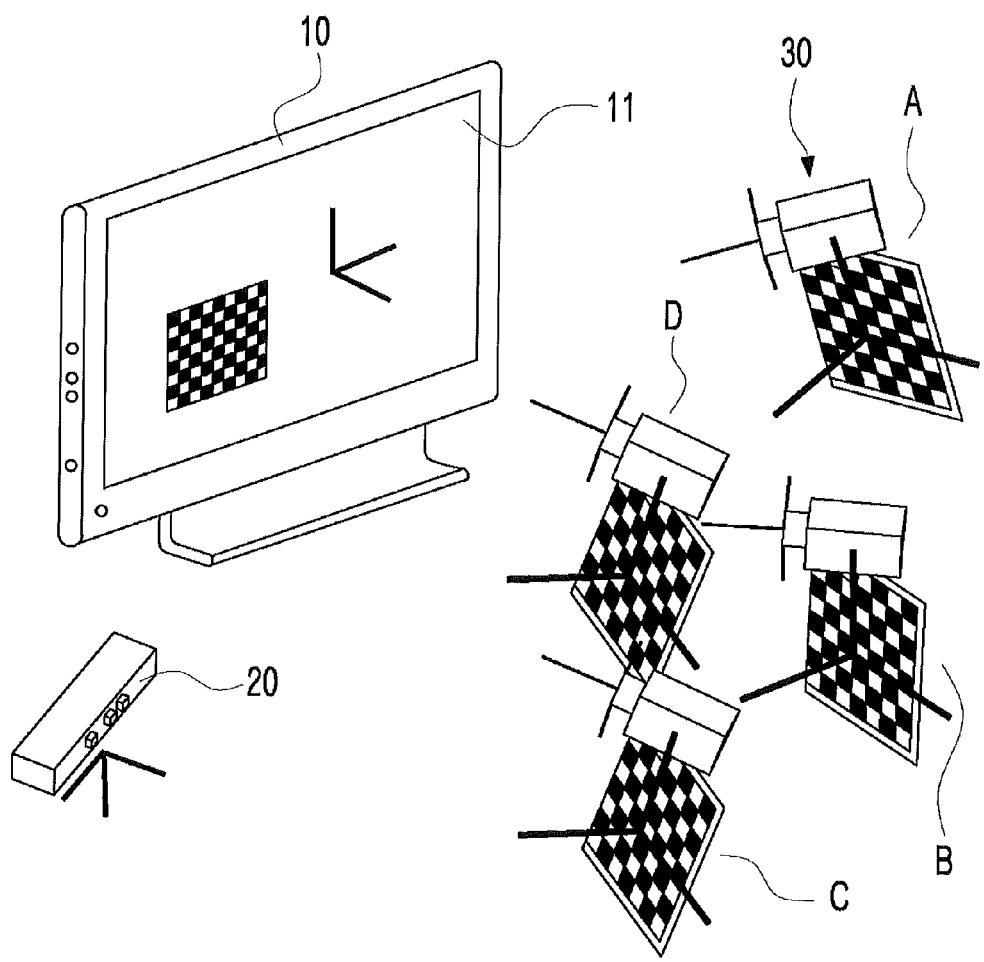
FIG. 2 is a schematic diagram for explaining a method for registering the display device and the image sensor by using the system in FIG. 1.

FIG. 1 is a schematic diagram for explaining a system to register a display device 10 and an image sensor 20 in accordance with one example embodiment of the present invention and FIG. 2 is a schematic diagram for explaining a method for registering the display device 10 and the image sensor 20 by using the system in FIG. 1.

The display device 10 includes a screen 11 for displaying images therethrough.

In the display device 10, a unique coordinate system of the display device, i.e., a display coordinate system, which has an origin $O_{Dis}$ as a reference of outputting an image through the flat screen 11 is set.

The display device 10 may be a three-dimensional (3D) TV that provides 3D images through which a user feels a real 3D effect.

The image sensor 20 collects information on a user or an object by taking shots of the user or the object with a camera-type sensor.

In accordance with an example embodiment of the present invention, a unique coordinate system of the image sensor, i.e., a sensor coordinate system, which has an origin $O_{Sec}$ as a reference of processing location data on the user or the object is set in the image sensor 20.

In accordance with an example embodiment of the present invention, the image sensor 20 is placed to observe the user or the object that faces the screen 11 and to prevent images displayed on the screen 11 from being directly observed.

In FIGS. 1 and 2, the image sensor 20 is separated from the display device 10, but it could be understood that the image sensor 20 may be fixed and installed to the display device 10 to be placed in the same direction to the screen 11.

To provide a user's correct visual perception as if the user who appreciates the image displayed in the screen 11 of the display device 10 touched the image directly by stretching his or her hand, it is, for example, necessary to properly adjust a location of the image, etc. displayed on the screen 11 to be registered to the location data of the user observed by the image sensor 20.

Thus, it is necessary to register data processed in the sensor coordinate system and data processed in the display coordinate system inter-transformably. In other words, it is required to obtain a transformation relationship between the sensor coordinate system and the display coordinate system.

In accordance with one example embodiment of the present invention, an auxiliary registration apparatus 30 is used to obtain information on a transformation relationship between the sensor coordinate system and the display coordinate system.

As illustrated in FIG. 1, the auxiliary registration apparatus 30 includes a camera 31 and a panel 32 which may be inter-operated with the camera 31.

Not being illustrated, the camera 31 and the panel 32 may be supported on a floor through a support stand, and may be moved to several places, if necessary, by referring to FIG. 2.

The camera 31 may take a variety of positions to the panel 32 and an angle of the camera 31 to the panel 32 may be changed. However, during the registration process, the position and the angle of the camera 31 to the panel 32 may be fixed.

In the camera 31, a unique coordinate system of the camera, i.e., a camera coordinate system, which has an origin $O_{Cam}$ as a reference of processing an image taken is set.

In a front part of the panel 32, a first pattern made of black and white squares is illustrated. The first pattern and a second pattern explained below are black and white grid for convenience of calculating coordinates, etc. but it is not necessary to be limited thereto. It is to be understood by those skilled in the art that other shapes, e.g., a concentric circle, of the patterns could get the desired effect.

The user may coordinate a location of each corner point of a grid of the first pattern in a unique coordinate system of a panel, i.e., a panel coordinate system, which has an origin $O_{Pat}$, e.g., one of corner points of the grid of the first pattern in the panel 32.

As illustrated in FIG. 1, the auxiliary registration apparatus 30 may be placed in front of the display device 10 and the image sensor 20 and to allow the camera 31 to take shots of the screen 11 of the display device 10 and to allow the first pattern of the panel 32 to be taken by the image sensor 20.

By taking an image which includes the second pattern on the screen 11 with the camera 31, the auxiliary registration apparatus 30 provides a transformation relationship between the camera coordinate system and the display coordinate system. Further, by allowing the image sensor 20 to take the first pattern, the auxiliary registration apparatus 30 provides a transformation relationship between the panel coordinate system and the sensor coordinate system. Accordingly, information for registering the sensor coordinate system and the display coordinate system inter-transformably can be acquired.

Not being illustrated, the auxiliary registration apparatus may include a control part which allows the first pattern displayed on the panel to be shot with the image sensor and the second pattern to be shot with the camera, by allowing locations or angles of the camera and the panel to be adjusted. Further, the control part allows information on a transformation relationship between the display coordinate system and the sensor coordinate system to be acquired by referring to information on the transformation relationship between the panel coordinate system and the sensor coordinate system obtained by using information on the first pattern shot with the image sensor and information on the transformation relationship between the camera coordinate system and the display coordinate system obtained by using information on the second pattern shot with the camera, to thereby allow the information on the transformation relationship between the display coordinate system and the sensor coordinate system to be used to register the display device and the image sensor.

By referring to FIG. 2, the registration method with the auxiliary registration apparatus 30 is explained in more detail.

First of all, an image of the second pattern is displayed on the screen 11 of the display device 10. The second pattern may include black and white square grid. The location of each corner point of the grid of the second pattern is coordinated by using the display coordinate system.

After the camera 31 and the panel 32 of the auxiliary registration apparatus 30 are fixed at a certain pose, the auxiliary registration apparatus 30 is moved to multiple locations, e.g., a location A through a location D within a shootable range of the image sensor. At this time, the second pattern is shot by using the camera 21 and the first pattern is shot by using the image sensor 20 at the respective multiple locations, e.g., the location A through the location D.

As explained above, an angle of the camera 31 to the panel 32 may be changed and the camera 31 takes a variety of positions to the panel 32. Accordingly, for example, as illustrated in FIG. 1, when the sensor 20 is located in front to the left of the display device 10, the panel 32 may be placed towards the sensor 20 and be adjusted to allow the first pattern to be easily observed by the sensor 20 and the camera 31 may be allowed to change its angle to the panel 32 properly and be adjusted to a position where the screen 11 of the display device 10 is observable easily. For another example, if the sensor 20 is placed downwards on the top of the display device 10, the panel 32 may be adjusted to be headed for front to look at the sensor 20.

As such, by configuring the auxiliary registration apparatus 30 to allow the camera 31 to take a variety of poses to the panel 32, i.e., to allow the angle of the camera to be changed to the panel 32, it may be flexibly dealt with in the acquisition of information on a position relationship between the display device and the image sensor even under a situation that information on mutual position of the camera 31 and the panel 32 is not known in advance.

By referring to FIG. 1, transformation formulas from the camera coordinate system to the panel coordinate system, from the display coordinate system to the camera coordinate system, from the panel coordinate system to the sensor coordinate system, and from the sensor coordinate system to the display coordinate system may be expressed as respective determinants $T_{Pat\_Cam}$, $T_{Cam\_Dis}$, $T_{Sen\_Pat}$ and $T_{Dis\_Sen}$. When locations of subscripts are interchanged in respective transformation formulas, it means the transformation to the reverse direction. For example, a transformation formula from the display coordinate system to the sensor coordinate system may be expressed as $T_{Sen\_Dis}$.

As expressed in a box in FIG. 1, the example embodiment of the present invention is to obtain a transformation relationship $T_{Dis\_Sen}$, i.e., a transformation relationship from the sensor coordinate system to the display coordinate system.

Again by referring to FIG. 2, a transformation relationship between the camera coordinate system and the display coordinate system is calculated by using information on the second pattern shot by using the camera 31 at respective multiple locations, e.g., the location A through the location D.

The transformation relationship between the camera coordinate system and the display coordinate system is obtained by a method for extracting a corner correspondence of the second pattern which is a flat grid. Specifically, intrinsic parameter and distortion parameter of the camera may be estimated by calibrating the camera through the a method for extracting the corner correspondence of the second pattern and a transformation relationship between the display coordinate system and the camera coordinate system may be obtained by referring to the estimated intrinsic parameter and distortion parameter. Since the above-described process is already disclosed, detailed explanation on the method is omitted here.

Next, a transformation relationship between the panel coordinate system and the sensor coordinate system is obtained by using information on the first pattern shot with the image sensor 20 at the multiple locations A through D. The transformation relationship between the panel coordinate system and the sensor coordinate system is obtained by a method for extracting a corner correspondence of the first pattern as a flat grid.

Again by referring to FIG. 1, it could be found that transformation relationships satisfy mathematical equation 1 as shown below.

$$T_{Cam\text{-}Dis}T_{Dis\text{-}Sen}T_{Sen\text{-}Pat}T_{Pat\text{-}Cam}=I_{3X3} \Rightarrow T_{Cam\text{-}Pat}=T_{Cam\text{-}Dis}T_{Dis\text{-}Sen}T_{Sen\text{-}Pat}$$ [Mathematical Equation 1]

As the location of the image sensor 20 is fixed to the display device 10 and that of the camera 31 is fixed to the panel 32, $T_{Dis\_Sen}$ and $T_{Pat\_Cam}$ in the mathematical equation 1 are fixed unknown values.

Accordingly, the mathematical equation 1 may be expressed as mathematical equation 2 as shown below.

$$T_{Cam\text{-}Pat}=T_{Cam\text{-}Dis}{}^{i}T_{Dis\text{-}Sen}T_{Sen\text{-}Pat}{}^{i}=T_{Cam\text{-}Dis}{}^{j}T_{Dis\text{-}Sen}T_{Sen\text{-}Pat}{}^{j}$$ [Mathematical Equation 2]

Being rendered down, the mathematical equation 2 could be expressed just like mathematical equation 3 as shown below.

$$(T_{Cam\text{-}Dis}{}^{j})^{-1}T_{Cam\text{-}Dis}{}^{i}T_{Dis\text{-}Sen}=T_{Dis\text{-}Sen}T_{Sen\text{-}Pat}{}^{j}(T_{Sen\text{-}Pat}{}^{i})^{-1}$$ [Mathematical Equation 3]

Because respective transformations are all Euclidean transformations, the mathematical equation 3 may be expressed in a Euclidean formula in a form of mathematical equation 4 as shown below.

$$AX=XB$$ [Mathematical Equation 4]

A solution has been already known to obtain a transformation relationship between the display coordinate system and the sensor coordinate system, i.e., $T_{Dis\_Sen}$, in the mathematical equation 3 rendered down as the Euclidean formula such as the mathematical equation 4 if a transformation relationship between the camera coordinate system and the display coordinate system, i.e., $T_{Cam\_Dis}$, and that between the panel coordinate system and the sensor coordinate system, i.e., $T_{Sen\_Pat}$, are known at at least three locations. In short, if the auxiliary registration apparatus 30 is moved to at least three locations, the transformation relationship between the display coordinate system and the sensor coordinate system may be obtained.

In summary, a relevant formula of a transformation relationship of each coordinate system, i.e., the mathematical equation 3, is provided by using serial transformation relationships among the sensor coordinate system, the panel coordinate system, the camera coordinate system, and the display coordinate system and a transformation relationship between the display coordinate system and the sensor coordinate system may be obtained by substituting, to the relevant formula, the transformation relationship between the camera coordinate system and the display coordinate system and that between the panel coordinate system and the sensor coordinate system obtained respectively at the multiple locations A through D.

In accordance with the example embodiment, the above-mentioned steps are repeatedly executed multiple times to maintain reliability of the registration and accordingly an optimized transformation relationship between the display coordinate system and the sensor coordinate system may be obtained through a non-linear optimization method that uses all pieces of information obtained during the repeated courses.

The non-linear optimization is to minimize a reprojection error caused by a camera and a cost function for the non-linear optimization is expressed as shown in mathematical equation 5, where a camera pose $T_{Cam\_Dis}$, a transformation relationship between the image sensor and the display $T_{Dis\_Sem}$ and that between the camera and the panel $T_{Cam\_Pat}$ are taken as variables and the intrinsic parameters and the distortion parameters of the camera and the image sensor and 3d-2d correspondences of the camera and the image sensor, i.e., $X_{Cami}^{j} \leftrightarrow X_{Cami}^{j}$ for the camera 31 and $X_{Seni}^{j} \leftrightarrow X_{Seni}^{j}$ for the image sensor, are given as values.

$$\sum_{i,j} \|X_{cami}^{j} - \int (X_{cami}^{j}|T_{Cam\_Dis}^{j}, K_{cam}, d_{cam})\| +$$

$$\sum_{i,j} \|X_{seni}^{j} - \int (X_{seni}^{j}|T_{Sen\_Pat}^{j}, K_{sen}, d_{sen})\| =$$

$$\sum_{i,j} \|X_{cami}^{j} -$$

$$\int (X_{cami}^{j}|T_{Cam_{Dis}}^{j}, K_{cam}, d_{cam})\| \sum_{i,j} \|X_{seni}^{j} -$$

$$\int (X_{seni}^{j}|(T_{Dis\_Sen}^{j})^{-1}|(T_{Cam\_Dis}^{j})^{-1}$$

$$T_{Cam\_Pat}, K_{Sen}, d_{Sen}\|$$

[Mathematical Equation 5]

In accordance with the present example embodiment, when the image sensor and the display device are registered by using the auxiliary registration apparatus, there is additionally no separate device required to provide the correct visual perception for the user to use the image sensor and the display device.

Accordingly, as shown in one example embodiment of the invention, if the image sensor is fixed and installed in the display device, it is sufficient to register the image sensor and the display device during the manufacturing process and it is possible to omit a unnecessary task including re-registration of the image sensor and the display device at a place of usage.

The method for registration in accordance with the present example embodiment could be widely applied in a virtual reality environment for family use by using a flat panel display and through an object contact-based next generation natural user interface (NUI), and small electronic devices such as a smart phone.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled person in a field of computer software. Computer readable record media include magnetic media such as hard disk, floppy disk, and magnetic tape, optical media such as CD-ROM and DVD, magneto-optical media such as floptical disk and hardware devices such as ROM, RAM, and flash memory specially designed to store and carry out programs. Program commands include not only a machine language code made by a complier but also a high level code that can be used by an interpreter etc., which is executed by a computer. The aforementioned hardware device can work as more than a software module to perform the action of the present invention and they can do the same in the opposite case.

As seen above, the present invention has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. An auxiliary registration apparatus for registering a display device and an image sensor, comprising:
   a camera;
   a panel which is interoperated with the camera and on which a first pattern is displayed; and
   a control part which allows the first pattern displayed on the panel to be shot with the image sensor and a second pattern which is a pattern displayed on a screen of the display device to be shot with the camera, by allowing locations or angles of the camera and the panel to be adjusted;
   wherein the control part allows information on a transformation relationship between a coordinate system of the display device and that of the image sensor to be acquired by referring to information on a transformation relationship between a coordinate system of the panel and that of the image sensor obtained by using information on the first pattern shot with the image sensor and information on a transformation relationship between a coordinate system of the camera and that of the display device obtained by using information on the second pattern shot with the camera, to thereby allow the information on the transformation relationship between the coordinate system of the display device and that of the image sensor to be used to register the display device and the image sensor.

2. The auxiliary registration apparatus of claim 1, wherein the control part registers the display device and the image sensor by referring to the acquired information on the transformation relationship between the coordinate system of the display device and that of the image sensor.

3. The auxiliary registration apparatus of claim 1, wherein an angle of the camera is changeable to the panel.

4. A method for registering a display device and an image sensor by using an auxiliary registration apparatus including a camera and a panel interoperated with the camera, comprising steps of:

(a) allowing a first pattern as a pattern displayed on the panel of the auxiliary registration apparatus to be shot with the image sensor and a second pattern as a pattern displayed on a screen of the display device to be shot with the camera of the auxiliary registration apparatus; and (b) allowing information on a transformation relationship between a coordinate system of the display device and that of the image sensor to be acquired by referring to information on a transformation relationship between a coordinate system of the panel and that of the image sensor obtained by using information on the first pattern shot with the image sensor and information on a transformation relationship between a coordinate system of the camera and that of the display device obtained by using information on the second pattern shot with the camera, to thereby allow the information on the transformation relationship between the coordinate system of the display device and that of the image sensor to be used to register the display device and the image sensor.

5. The method of claim 4, further comprising a step of:

(c) registering the display device and the image sensor by referring to the acquired information on the transformation relationship between the coordinate system of the display device and that of the image sensor.

6. The method of claim 4, wherein, at the step of (a), the first pattern and the second pattern are shot multiple times while the auxiliary registration apparatus is moved or rotated within an available shooting range of the image sensor.

7. The method of claim 4, wherein the image sensor is placed at a location where an image displayed on the screen cannot be directly observed.

8. The method of claim 4, wherein steps (a) through (b) are repeated multiple times and wherein the information on the transformation relationship between the coordinate system of the display device and that of the image sensor is obtained through a non-linear optimization method by using information obtained during the course of repetition.

9. The method of claim 4, wherein the first pattern and the second pattern are grid patterns.

10. The method of claim 4, wherein an angle of the camera is changeable to the panel.

11. An electronic device which is registered by using an auxiliary registration apparatus including a camera and a panel, interoperated with the camera, on which a first pattern is displayed, comprising:

a display device with a screen which displays a second pattern; and an image sensor interoperated with the display device;

wherein information on a transformation relationship between a coordinate system of the display device and that of the image sensor, which is acquired by a control part of the auxiliary registration apparatus referring to information on a transformation relationship between a coordinate system of the panel and that of the image sensor obtained by using information on the first pattern shot with the image sensor and information on a transformation relationship between a coordinate system of the camera and that of the display device obtained by using information on a second pattern shot with the camera, is used to provide the display device and the image sensor in a registered state.

12. The device of claim 11, wherein the image sensor is combined with the display device.

13. The device of claim 11, wherein the display device provides three-dimensional images.

* * * * *